(12) United States Patent
Dortmund et al.

(10) Patent No.: US 10,845,073 B2
(45) Date of Patent: Nov. 24, 2020

(54) METHOD AND DEVICE FOR TEMPERATURE CONTROL IN A RADIO RECEIVER

(71) Applicant: Apple Inc., Cupertino, CA (US)

(72) Inventors: Sven Dortmund, Essen (DE); Kenan Kocagoez, Nuremberg (DE); Jose A. Cesares Cano, Dresden (DE); Wolfgang Molzer, Ottobrunn (DE); Matthias Obermeier, Taufkirchen (DE)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 15/347,880

(22) Filed: Nov. 10, 2016

(65) Prior Publication Data

US 2017/0167745 A1 Jun. 15, 2017

(30) Foreign Application Priority Data

Dec. 11, 2015 (DE) .......................... 10 2015 121 628

(51) Int. Cl.
*F24F 11/00* (2018.01)
*F24F 11/30* (2018.01)
*H04L 1/18* (2006.01)

(52) U.S. Cl.
CPC ............ *F24F 11/30* (2018.01); *H04L 1/1822* (2013.01); *H04L 1/1861* (2013.01); *H04L 1/1864* (2013.01); *G05B 2219/15117* (2013.01); *G05B 2219/2614* (2013.01)

(58) Field of Classification Search
CPC .......................................... G05B 2219/15117
USPC ....................................................... 455/558
See application file for complete search history.

(56) References Cited

U.S. PATENT DOCUMENTS

| 2012/0135696 A1* | 5/2012 | Lerzer | H04W 52/0296 455/127.1 |
| 2014/0064160 A1* | 3/2014 | Verger | H04W 72/14 370/311 |
| 2014/0112221 A1* | 4/2014 | Verger | H04W 52/0216 370/311 |
| 2014/0247729 A1* | 9/2014 | Sahu | H04W 52/0261 370/252 |
| 2014/0274011 A1* | 9/2014 | Jain | H04W 8/22 455/418 |

(Continued)

FOREIGN PATENT DOCUMENTS

WO WO-2010127725 A1 11/2010

OTHER PUBLICATIONS

"Germany Application Serial No. 102015121628.0, Office Action dated Jul. 14, 2016", W/ English Translation, 26 pgs.

(Continued)

*Primary Examiner* — Emilio J Saavedra
(74) *Attorney, Agent, or Firm* — Kowert, Hood, Munyon, Rankin & Goetzel, P.C.

(57) ABSTRACT

A method (300) for temperature control in a radio receiver includes: receiving (301) a sequence of radio subframes, wherein each radio subframe (200) in the sequence of radio subframes comprises at least one control region (201) and at least one data region (202); monitoring (302) temperature information indicating a system temperature (T) of the radio receiver; and if the temperature information indicates that the system temperature (T) exceeds (303) a first threshold (T1), transition (304) to a second state (305) in which receiving the at least one data region is disabled.

20 Claims, 10 Drawing Sheets

(56) References Cited

U.S. PATENT DOCUMENTS

| | | | | |
|---|---|---|---|---|
| 2015/0000889 A1* | 1/2015 | Bellamkonda | ........... | G01K 7/42 |
| | | | | 165/287 |
| 2015/0078251 A1* | 3/2015 | Clevorn | .................... | H04L 1/16 |
| | | | | 370/328 |
| 2015/0288792 A1* | 10/2015 | Nayak | ................... | H04M 1/675 |
| | | | | 455/558 |
| 2016/0143035 A1* | 5/2016 | Xue | ........................ | H04L 5/001 |
| | | | | 370/329 |
| 2016/0262143 A1* | 9/2016 | Breuer | .................. | H04W 76/20 |

OTHER PUBLICATIONS

Kawswer, M T, "Limiting HARQ Retransmissions in Downlink for Poor Radio Link in LTD", In: International Journal of Information and Electronics Engineering, vol. 2, No. 5, (Sep. 2012), 707-709.

* cited by examiner

METHOD AND DEVICE FOR TEMPERATURE CONTROL IN A RADIO RECEIVER

This application claims the benefit of priority to German Patent Application No. 10 2015 121 628.0, filed Dec. 11, 2015, which is incorporated herein by reference in its entirety.

FIELD

The disclosure relates to methods for temperature control in a radio receiver and temperature control devices for a radio receiver. In particular, the disclosure relates to techniques for substantial temperature reduction in connected mode for high throughput, in particular in LTE connected mode.

BACKGROUND

In a radio communication system 100, e.g. as illustrated in FIG. 1 a mobile station 120 (or mobile terminal or user equipment, UE) is powered for communication 101 with a radio cell 110 (or base station or NodeB). High data throughput use cases are related with high activity of large parts of HW blocks of the radio receiver of the mobile station 120 and thus high active and leakage power dissipation. Leakage power strongly increases with junction temperature leading to a positive feedback between leakage power and junction temperature. In worst case situations this can lead to thermal runways 130. Data throttling concepts to overcome thermal issues of a wireless system either result in a slower reduction of the chip temperature or apply a sledge-hammer method like artificial out-of-service that makes the UE 'blind'. There is a need to provide a concept for an intelligent data throttling in high data throughput environments.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
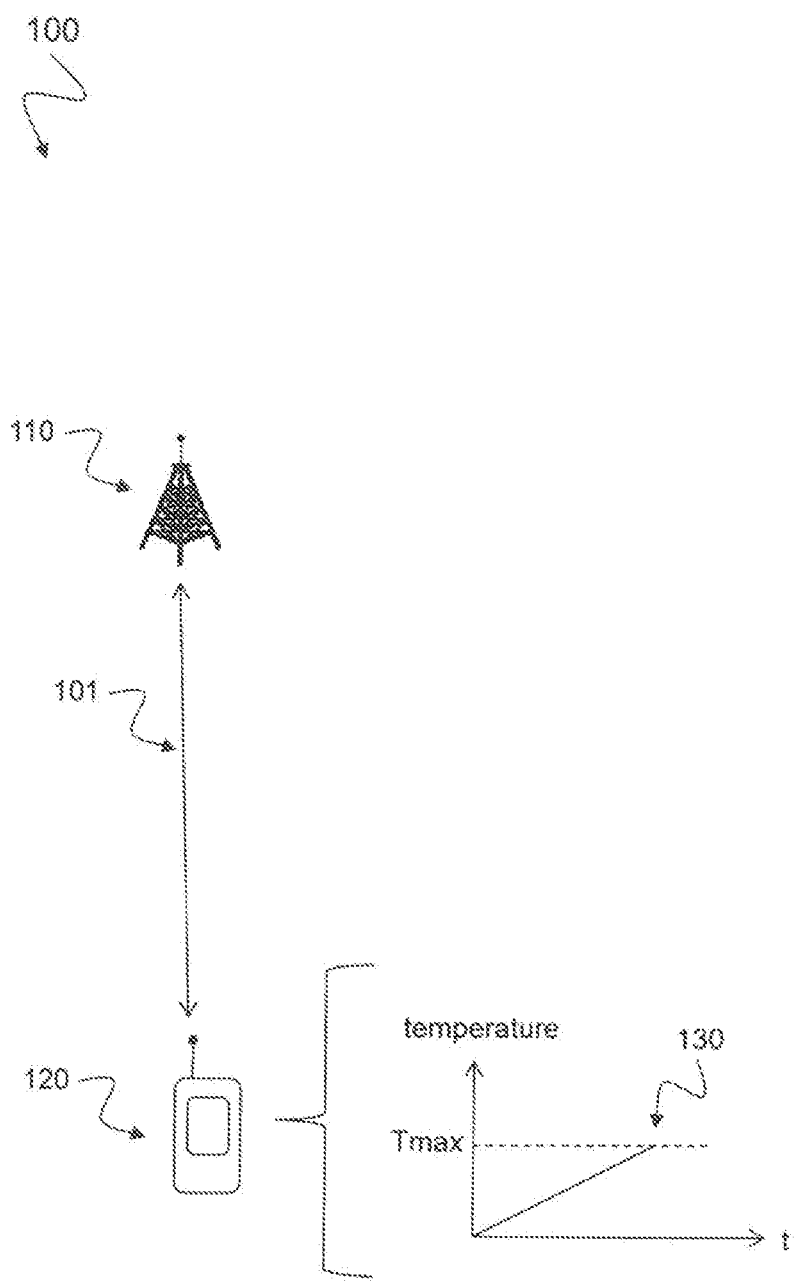
FIG. 1 is a schematic diagram illustrating a radio communication system 100.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
CRS: Cell specific Reference Signal,
RE: Resource Element,
RB: Resource Block, e.g., a resource block in frequency direction times slot in time direction,
PRB: Physical Resource Block,
3GPP: 3rd Generation Partnership Project,
LTE: Long Term Evolution,
LTE-A: LTE Advanced, Release 10 and higher versions of 3GPP LTE,
RF: Radio Frequency,
UE: User Equipment,
SINR: Signal-to-interference and noise ratio,
OFDM: Orthogonal Frequency Division Multiplex,
eNB,
eNodeB: Base station,
(e)ICIC: (enhanced) Inter-Cell Interference Coordination,
MIMO: Multiple Input Multiple Output,
CE: Channel Estimation,
HARQ: Hybrid Automatic Repeat Request,
PDCCH: Physical Downlink Control Channel,
DL: Downlink,
UL: Uplink,
BW: Bandwidth,
DCI: Downlink Control Information,
PDSCH: Physical Downlink Shared Channel,
CA Carrier aggregation,
DRX: Discontinuous receive,
CDRX: Connected mode DRX.

The methods and devices described herein may be based on temperature control and temperature control circuits in mobile devices and radio receivers, in particular LTE radio receivers. System temperature, e.g. chip temperature may be determined by using a system temperature manager. The system temperature manager may be implemented as a software instance which controls the temperature sensors of all kind, e.g. integrated, mounted device, sensor, that can detect and/or measure and/or report system temperature at various locations, e.g. on chip, printed circuit board (PCB), etc. The system temperatures cover the measured temperature reported by the sensors and the temperatures derived from utilizing the sensor measurements. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may be implemented in mobile devices (or mobile stations or User Equipments (UE)), in particular in radio receivers of such mobile devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G LTE, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in multi-layer heterogeneous networks. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes.

The methods and devices described hereinafter may be applied in Carrier Aggregation systems. Carrier Aggregation systems may enable an LTE-A UE to connect to several carriers simultaneously. It not only may allow resource allocation across carriers, it also may allow scheduler based fast switching between carriers without time consuming handover.

The methods and devices described hereinafter may be applied in MIMO systems and diversity receivers. Multiple-input multiple-output (MIMO) wireless communication systems employ multiple antennas at the transmitter and/or at the receiver to increase system capacity and to achieve better quality of service. In spatial multiplexing mode, MIMO systems may reach higher peak data rates without increasing the bandwidth of the system by transmitting multiple data streams in parallel in the same frequency band. A diversity receiver uses two or more antennas to improve the quality and reliability of a wireless link.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

Figure 2:
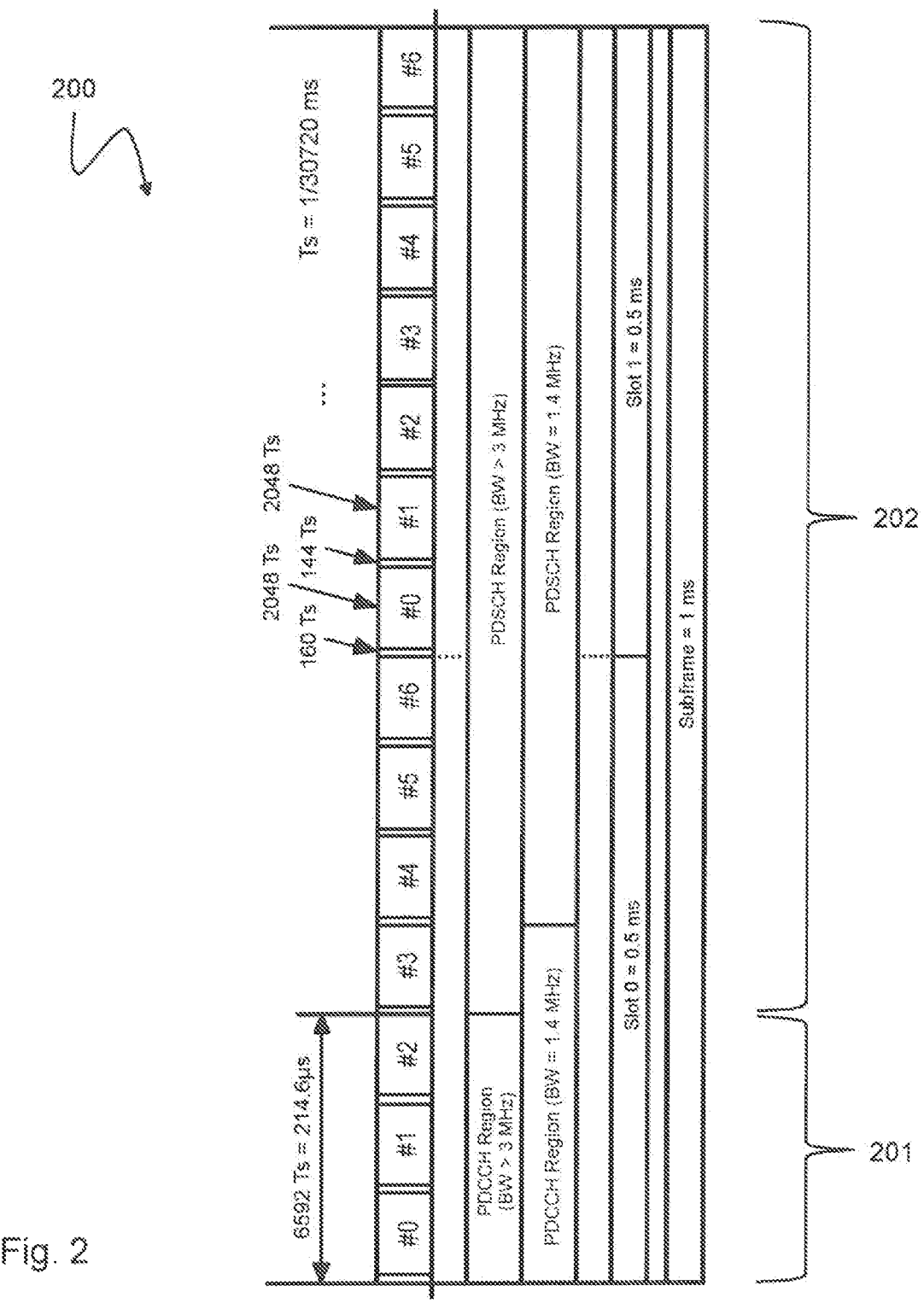
FIG. 2 is a timing diagram of a basic LTE subframe 200.

Methods and devices according to the disclosure are configured to receive radio subframes, in particular LTE subframes according to the timing diagram of a basic LTE subframe 200 as depicted in FIG. 2. The LTE subframe 200 may be received as a radio subframe by the methods and devices as described below with respect to FIGS. 3 to 10. The LTE subframe 200 may be received by the receive paths 405, 807 as described below with respect to FIGS. 4 and 8.

In LTE a 1 ms downlink radio subframe 200 consists of 14 OFDM symbols (with normal cyclic prefix). The PDCCH (Physical Downlink Control Channel) 201 is always transmitted in the first symbols of a DL subframe 200 and carries Downlink Control Information (DCI). The exact number of OFDM symbols carrying the PDCCH 201 is dynamically chosen by the eNodeB and is signaled in the PCFICH (Physical Control Format Indicator Channel). For cell bandwidth (BW)>=3 MHz it can be transmitted in the first up to 3 symbols; for BW=1.4 MHz in the first up to 4 symbols, respectively. The following, remaining symbols of the subframe contain the PDSCH (Physical Downlink Shared Channel) 202 which carries user data and higher layer control messages. Timing details can be seen in FIG. 2.

Every OFDM symbol has a duration of 2048 Ts and is preceded by a cyclic prefix. The cyclic prefix for the first OFDM symbol in a slot has a duration of 160 Ts, for all others the duration is 144 Ts.

The DCI on the PDCCH 201 includes UL grant information, i.e. whether there is data for the UE in the following PDSCH symbols 202 of the subframe 200 or not. The sequence of PDCCH 201 and PDSCH 202 was chosen intentionally to allow power saving on the UE side: if there is no UL grant on PDCCH 201 the Rx path can theoretically be turned off during the PDSCH region 202. This is of particular relevance in RRC (Radio Resource Control) connected state, where the UE has to continuously monitor the PDCCH 201, except for connected mode DRX (Discontinuous Receive).

Methods and devices according to the disclosure as described below allow temperature reduction in LTE connected mode for high data throughput use cases by means of data throttling, in particular by using a smooth downlink throughput throttling that allows for control plane data reception by mimicking a temporary degrade of the radio conditions for a short period of time.

Methods and devices according to the disclosure as described below may use states for describing a specific behavior of the radio receiver. For example, a second state may describe a power saving mode, also referred to as "PDCCH Only Mode" hereinafter. In this power saving mode, receiving of specific sections of a receive signal that is received by a receive path of the radio receiver is turned-off in order to save power and hence reducing temperature of the radio receiver. Further details of this second state are described below, in particular with respect to FIGS. 5, 6 and 9, 10.

A first state, for example, may describe a normal power mode, also referred to as "Normal Mode" or "PDCCH normal" hereinafter. In this normal power mode, receiving of the above-described specific sections of the receive signal are turned-on, i.e. enabled in order to receive the full information of the radio signal, in particular the user data information included in the PDSCH region of an LTE radio subframe as depicted in FIG. 2. In this first state due to heavy data traffic, temperature of the radio receiver may increase. Methods and devices according to the disclosure provide a control technique for controlling transition between these two states in order to control a system temperature, e.g. a chip temperature of the radio receiver, e.g. a broadband (BB) device chip temperature and to protect the radio receiver from being damaged.

Figure 3:
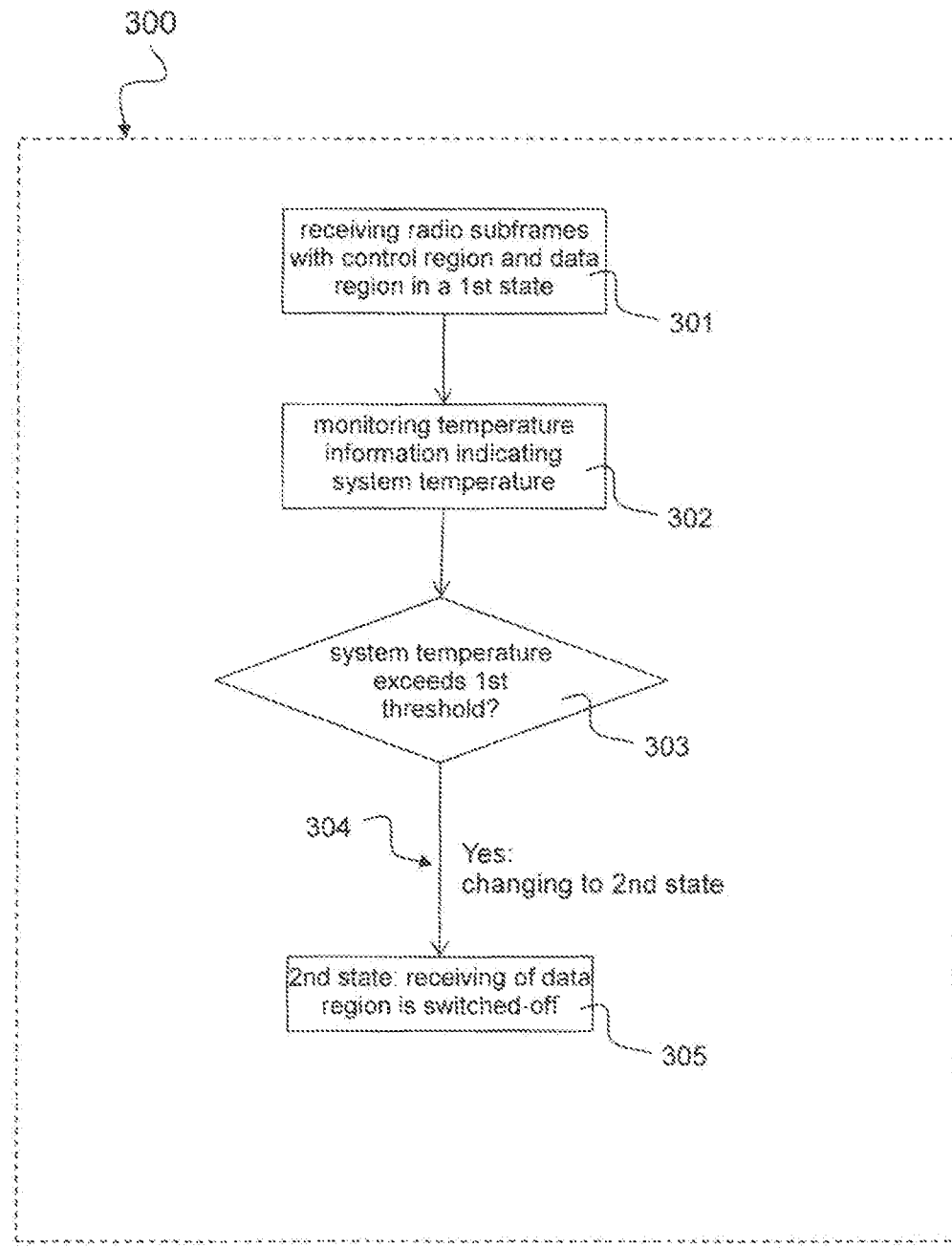
FIG. 3 schematically illustrates an exemplary method 300 for temperature control in a radio receiver according to a first approach.

FIG. 3 schematically illustrates an exemplary method 300 for temperature control in a radio receiver according to a first approach.

The method includes receiving 301 a sequence of radio subframes, e.g. a sequence of LTE radio subframes 200 as described above with respect to FIG. 2, in a first state. Each radio subframe 200 in the sequence of radio subframes includes at least one control region, e.g. a PDCCH region 201 as described above with respect to FIG. 2 and at least one data region, e.g. a PDSCH region 202 as described above with respect to FIG. 2.

The method further includes monitoring 302 a temperature information indicating a system temperature, e.g. a chip temperature T of the radio receiver, e.g., a chip temperature T available from a health monitor. The method 300 further includes: If the monitored temperature information indicates that the system temperature T exceeds 303 a first threshold, e.g. a first threshold T1 as described below with respect to FIG. 6, changing 304, i.e. transition to a second state 305 in which receiving the at least one data region is switched-off.

The at least one control region 201 and the at least one data region 202 may be successively arranged in each radio subframe 200, e.g. as depicted in FIG. 2. The method 300 may further include monitoring control information from at least one control region 201 of at least one radio subframe 200 in the sequence of radio subframes, e.g. a control information field, for example a UL grant included in the PDCCH region 201 depicted in FIG. 2.

The method 300 may further include identifying at least one pending retransmission of a radio subframe 200 from the control information, e.g. a non-acknowledgement Nack related to a HARQ process as described below with respect to FIG. 6.

The method 300 may further include acknowledging the at least one pending retransmission in the second state 305. Even in the second state where receiving data regions is turned-off, pending retransmissions can be acknowledged in order to avoid further retransmissions.

The method 300 may further include: if the monitored temperature information 302 indicates that the system temperature T falls below a second threshold, e.g. a second threshold T2 as described below with respect to FIG. 6, changing, i.e. transition from the second state 305 (corresponding to the second state 501 as described below with respect to FIG. 5) to a first state (corresponding to the first state 502 as described below with respect to FIG. 5) in which receiving the at least one data region 202 of the sequence of radio subframes is turned-on, i.e. enabled.

The method 300 may further include changing, i.e. transition from the second state 501 to the first state 502 independently of the monitored temperature information 302 if a given maximum duration of stay in the second state 501 is reached 503, e.g. a maximum duration of stay $t_{onlyMax}$ as described below with respect to FIG. 5.

In the first state 502 receiving the at least one control region 201 of the sequence of radio subframes may be turned-on, i.e. enabled to monitor information indicating a presence of user data in the corresponding at least one data region 202, e.g. user data in the PDSCH region as shown in FIG. 2.

The method 300 may further include monitoring the at least one control region 201 of the sequence of radio subframes for scheduling allocation, e.g. DL assignment or UL grant information while the receiving the at least one data region is switched-off 305, 501. That means that even if the receiving the data region 202 is switched off, receiving the control region is still possible in order to check for scheduling allocation.

The method 300 may further include monitoring the at least one control region 201 of the sequence of radio subframes for UL grant information and decoding the at least one corresponding data region 202 while the receiving the at least one corresponding data region is switched-on 502. If both, the control region and the data region can be received, UL grant information can be received from the PDCCH region 201 and the corresponding information in the PDSCH region 202 can be decoded.

Figure 4:
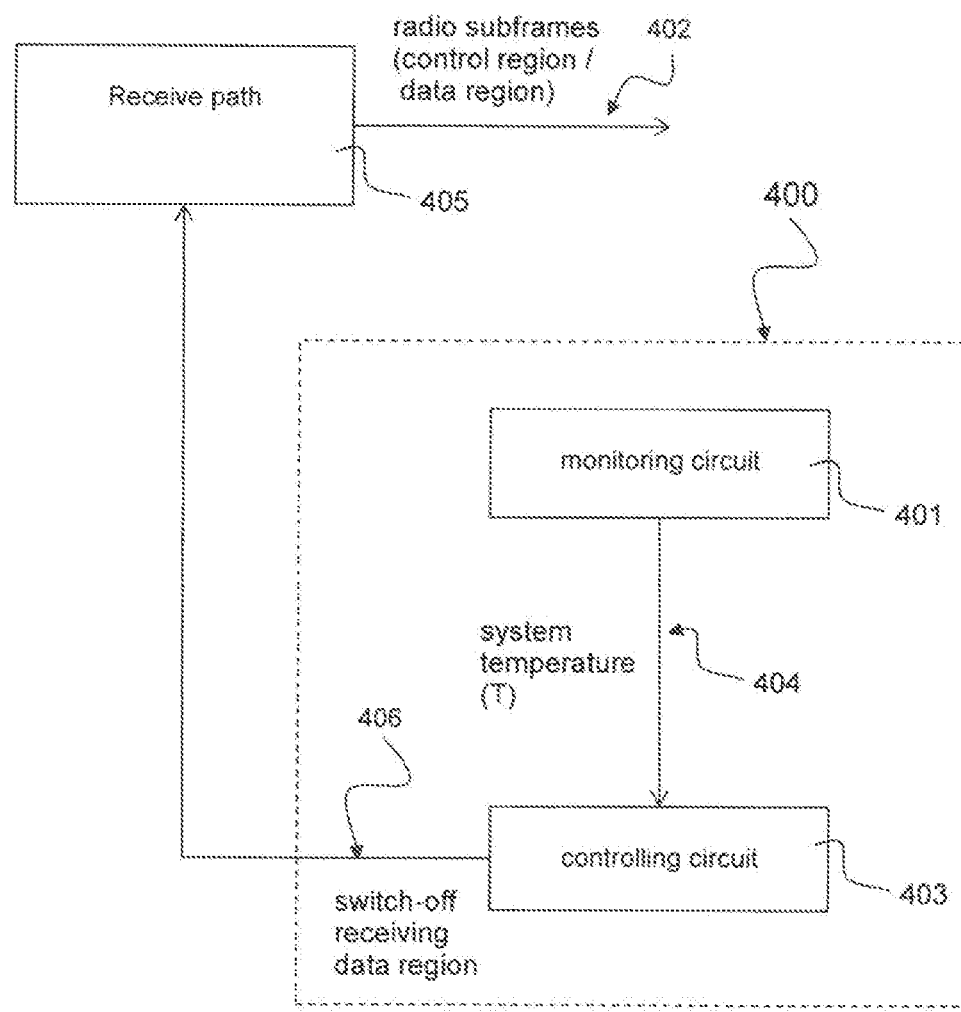
FIG. 4 schematically illustrates an exemplary temperature control circuit 400 for a radio receiver according to the first approach.

FIG. 4 schematically illustrates an exemplary temperature control circuit 400 for a radio receiver according to the first approach. The temperature control circuit 400 includes a monitoring circuit 401 and a controlling circuit 403.

The radio receiver includes a receive path depicted in FIG. 4 for receiving a sequence of radio subframes, e.g. LTE subframes 200 as described above with respect to FIG. 2. Each radio subframe 200 in the sequence of radio subframes includes at least one control region, e.g. a PDCCH region 201 as shown in FIG. 2 and at least one data region, e.g. a PDSCH region 202 as shown in FIG. 2.

The monitoring circuit 401 monitors temperature information 404 that indicates a system temperature, e.g. a chip temperature T of the radio receiver.

The controlling circuit 403 is configured to change, i.e. transition to a second state, e.g. a second state 305 as described above with respect to FIG. 3 or a second state 501 as described below with respect to FIG. 5, in which receiving the at least one data region 202 is switched-off 406 if the monitored temperature information 404 indicates that the system temperature T exceeds a first threshold, e.g. a first threshold T1 as described below with respect to FIG. 6.

The controlling circuit 403 may change, i.e. transition from the second state 501 to a first state, e.g. a first state 502 as described below with respect to FIG. 5, in which receiving the at least one data region 202 of the sequence of radio subframes 200 is turned-on, i.e. enabled, if the monitored temperature information 404 indicates that the system temperature T falls below a second threshold, e.g. a second threshold T2 as described below with respect to FIG. 6.

The temperature control circuit 400 may further include a second monitoring circuit for monitoring the at least one control region 201 of at least one radio subframe 200 for UL grant information independently of a switch-off 406 of the receiving the at least one data region 202. That means, the second monitoring circuit may permanently monitor for UL grant information during switch-off and switch-on phases of the data regions.

The temperature control circuit 400 may further include a decoding circuit for decoding the at least one data region 202 while the receiving the at least one data region is turned-on, i.e. enabled, i.e. while the temperature control circuit 400 is in the first state 502 as described below with respect to FIG. 5.

Figure 5:
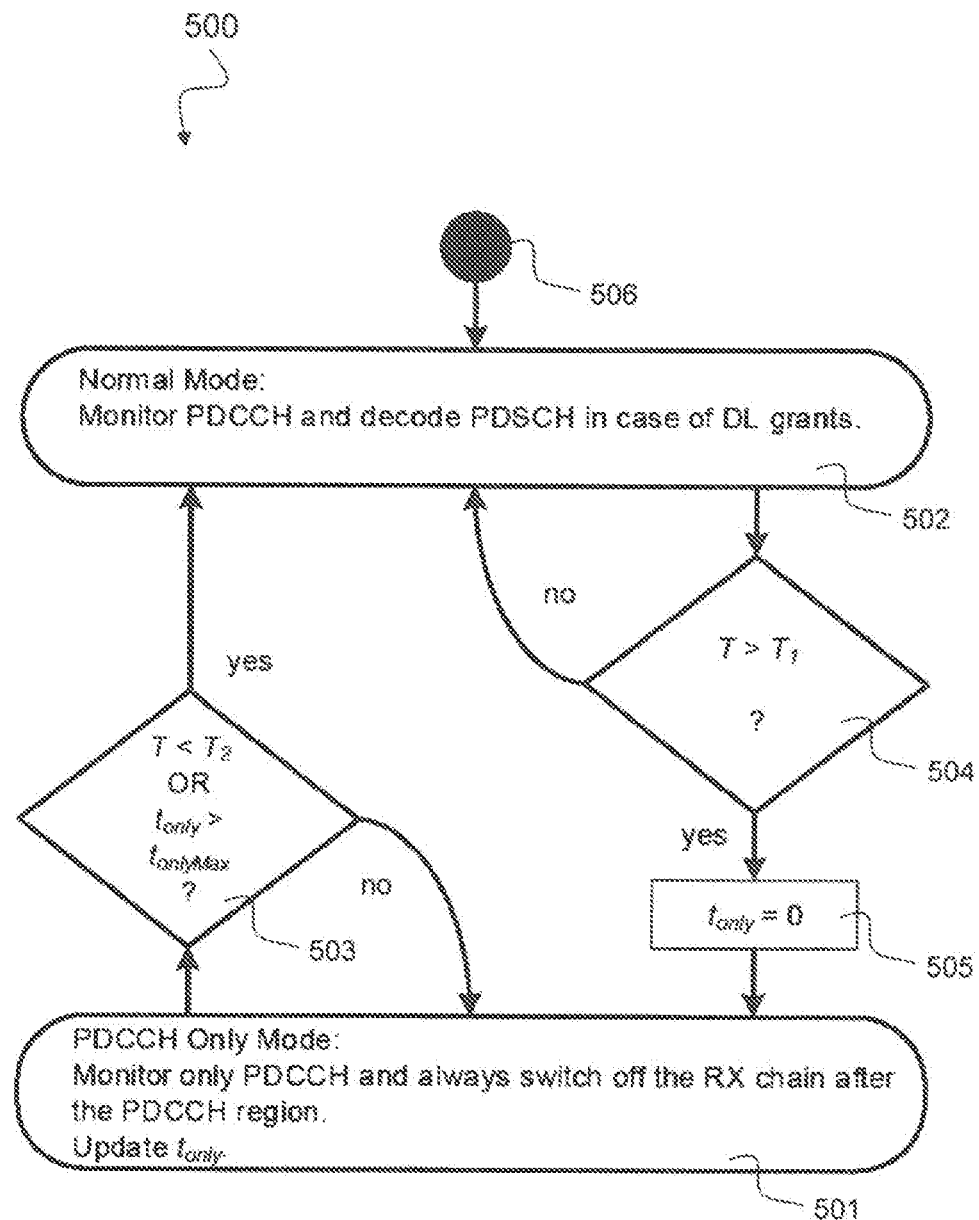
FIG. 5 is a basic state diagram 500 for entering and leaving PDCCH Only Mode according to the first approach.

FIG. 5 is a basic state diagram 500 for entering and leaving PDCCH Only Mode according to the first approach. This state diagram 500 illustrates a first approach for temperature control, hereinafter also referred to as the "basic algorithm" in comparison to the "advanced algorithm" as illustrated in the state diagram 900 described below with respect to FIG. 9.

The algorithm of the basic algorithm is outlined in FIG. 5. Starting in "normal PDCCH decoding mode" 502 (according to state 2 as described above with respect to FIGS. 3 and 4), the algorithm shall trigger "PDCCH only mode" 501 (according to state 1 as described above with respect to FIGS. 3 and 4) in case $T > T_1$ 504 and initializes the time spent in only mode with $t_{only} = 0$, 505. If $T > T_1$ decrease below $T_2$ or the counter $t_{only}$ reaches a timeout value 503 the algorithm shall trigger the mode change back to "normal PDCCH decoding mode" 502. The timeout value 503 is a tunable parameter which should be selected according to the network configuration to prevent any call drops. Additionally, a comparable timer and corresponding timeout value for the "normal mode" 502 is applicable which should be in the range of some ms to continue with the throttling method after all required messages are received during the normal mode operation 502. This second timer is not shown in FIG. 5 for brevity.

The basic algorithm may utilize the system temperature, e.g. the chip temperature T as reported by a system temperature manager and two thresholds, $T_1$ for entering "PDCCH only decoding mode" 501 and $T_2$ to return to "PDCCH normal decoding" 502 as well a maximum residency time, that prevents the wireless system from an endless throttling period and shall allow for timely MAC Control Element reception to allow for proper timing advance adjustments for the uplink. The system temperature manager may be implemented as a software instance which controls the temperature sensors of all kind, e.g. integrated, mounted device, sensor, that can detect and/or measure and/or report system temperature at various locations, e.g. on chip, printed circuit board (PCB), etc. The system temperatures cover the measured temperature reported by the sensors and the temperatures derived from utilizing the sensor measurements. At this, during "PDCCH only mode" 501, the downlink control channels are decoded and the RF receiver is turned off immediately after its reception, so that any allocations of the Physical Downlink Shared CHannel (PDSCH) is avoided. At this, downlink control channels include the Physical Downlink Control CHannel (PDCCH), the Physical Control Format Indicator CHannel (PCFICH), the Physical Hybrid-ARQ Indicator CHannel (PHICH) and the first set of Cell Specific Reference Signals (CRS) contained in the first and fifth symbol of each OFDM subframe as described above with respect to FIG. 2.

Figure 6:
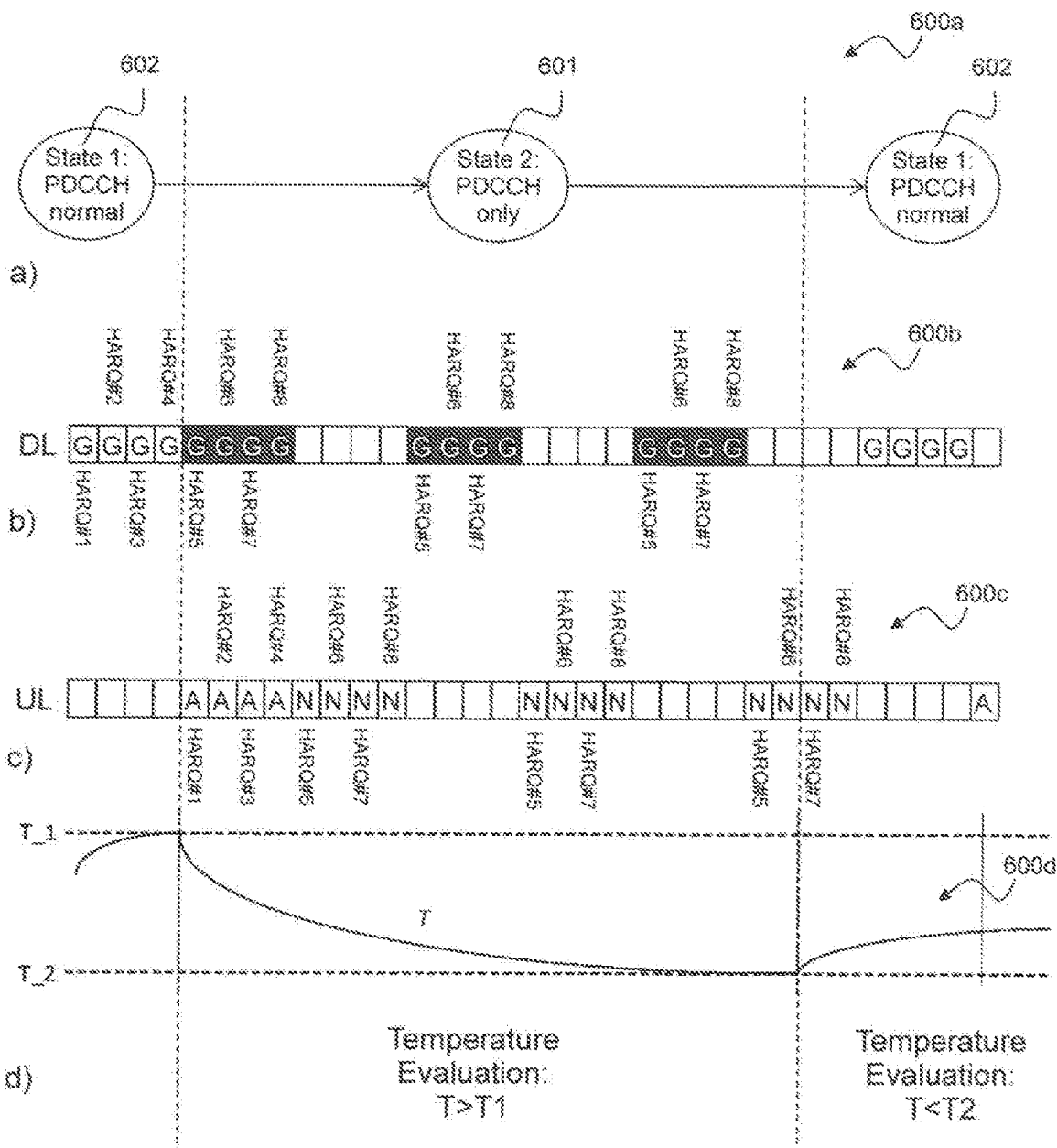
FIG. 6 schematically illustrates an exemplary utilization of the PDCCH Only Mode according to the first approach for thermal throttling.

FIG. 6 schematically illustrates an exemplary utilization of the "PDCCH Only Mode" 501 according to the first approach for thermal throttling. FIG. 6 illustrates an exemplary implementation of the "basic algorithm" as described above with respect to FIG. 5. This example is not restrictive in nature and shall mainly introduce the concept according to the disclosure rather than hinting to the duration of the throttling or the parameters chosen for the threshold.

After T reaches $T_1$ (see FIG. 6d) the reception mode is switched immediately from "PDCCH normal decoding" (State 1, 602, see FIG. 6a) to "PDCCH only mode" (State 1, 601, see FIG. 6a), so that no further downlink allocations can be received indicated by the white colored DL blocks for HARQ process #5 to #8 turning black after the mode switch (see FIG. 6b). Previous HARQ processes #1-#4 can be acknowledged while utilizing PDCCH only (see A, A, A, A in FIG. 6c) as TX activity in parallel to this feature is possible. At this, further throttling methods targeting the uplink throughput can coexist with the presented feature.

While T is decreasing (see FIG. 8d) since the turbo decoder is not active during PDCCH only mode 601, none-acknowledgement messages (see N,N,N,N in FIG. 8c) trigger retransmissions from the eNB. This process mimics worse radio conditions for a certain time period of time that should be sufficient to cool down T until the value reaches $T_2$ (see FIG. 8d) to return to PDCCH normal decoding 602. Not illustrated is the effect of an additional timer $t_{onlyMax}$ as described above with respect to FIG. 5 that may be used to prevent the device from permanently staying in PDCCH only mode 601 and shall allow for timely MAC CE reception, especially for TA adjustments as mentioned above.

Assuming full uplink and downlink allocation with two aggregated carriers of bandwidth 20 MHz, the first threshold temperature $T_1$ could be reached if the device is operated in high environmental temperature conditions. Utilizing the above mentioned throttling method, reaching the second threshold temperature $T_2$ will require the device to stay in PDCCH mode 601 for several seconds. Simulations of the thermal behavior of a typical radio receiver for the above described scenario resulted in an overall throttling period of a couple of seconds duration whereas FIG. 6 illustrates a much quicker temperature reduction for simplicity.

The advantage of the temperature control technique described above over known solutions is the ongoing reception of the physical downlink control channel while discarding physical downlink shared channel allocations before they even occur. Alongside a significant temperature reduction of the UE, it is still possible to react on the eNodeB and perform uplink activity on both, control and shared channel.

Reducing the power consumption for a certain mode of operation is followed by a reduction of the system temperature as well. At this, the initial temperature decrease follows an exponential curve. In a scenario with high throughput, the PDSCH region is the main contributor to power consumption due to the turbo decoding of the payload. The PDCCH only mode 601 provides the opportunity to prevent the UE from the reception of the PDSCH region of a subframe at the very beginning, including switching of the RF upfront so that with the transceiver another main contributor to power consumption is included in the throttling method.

Figure 7:
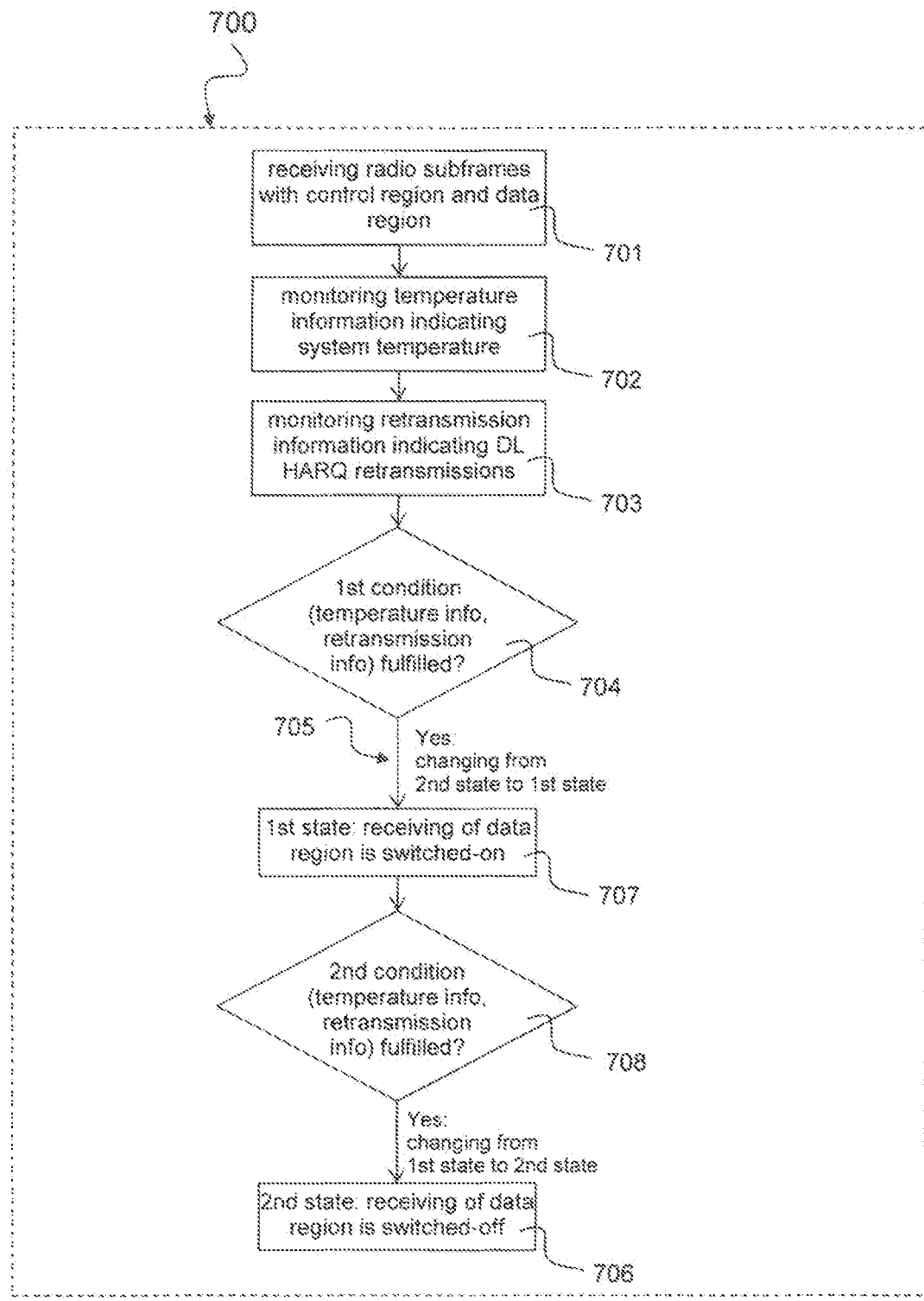
FIG. 7 schematically illustrates an exemplary method 700 for temperature control in a radio receiver according to a second approach.

FIG. 7 schematically illustrates an exemplary method 700 for temperature control in a radio receiver according to a second approach.

The method 700 includes receiving 701 a sequence of radio subframes, e.g. a sequence of LTE radio subframes 200 as described above with respect to FIG. 2. Each radio subframe 200 in the sequence of radio subframes includes at least one control region, e.g. a PDCCH region 201 as described above with respect to FIG. 2 and at least one data region, e.g. a PDSCH region 202 as described above with respect to FIG. 2.

The method 700 further includes monitoring 702 temperature information indicating a system temperature, e.g. a chip temperature T of the radio receiver, e.g., a chip temperature T available from a health monitor. The method 700 further includes monitoring 703 retransmission information indicating a number of pending radio subframe retransmissions $N_{NACK,x}$, e.g. HARQ retransmissions as described below with respect to FIG. 10.

The method 700 further includes changing 705 from a second state 706 in which receiving the at least one data region 202 is switched-off to a first state 707 in which receiving the at least one data region 202 is turned on if a first condition with respect to at least one of the monitored temperature information 702 and the monitored retransmission information 703 is fulfilled 704.

The at least one control region 201 and the at least one data region 202 may be successively arranged in each radio subframe 200, e.g. as depicted in FIG. 2. The method 700 may further include monitoring control information from at least one control region 201 of at least one radio subframe 200 in the sequence of radio subframes, e.g. a control information field, for example a UL grant included in the PDCCH region 201 depicted in FIG. 2.

The first condition may be fulfilled 704 if at least one of the following events occur: the monitored temperature information 702 indicates that the controlled system temperature, e.g. a chip temperature T falls below a second threshold, e.g. a second threshold T2 as described below with respect to FIG. 10, the monitored retransmission information 703 indicates that the number of pending radio subframe retransmissions, e.g. HARQ retransmissions $N_{NACK,x}$ as described below with respect to FIG. 10 exceeds a maximum number of pending radio subframe retransmissions, e.g. a maximum number of HARQ retransmissions $N_{NACK,max}$ as described below with respect to FIG. 10. The number of pending retransmissions may be a parameter of the algorithm that may be utilized for a trade-off between duration of the throttling period and performance impact.

Figure 9:
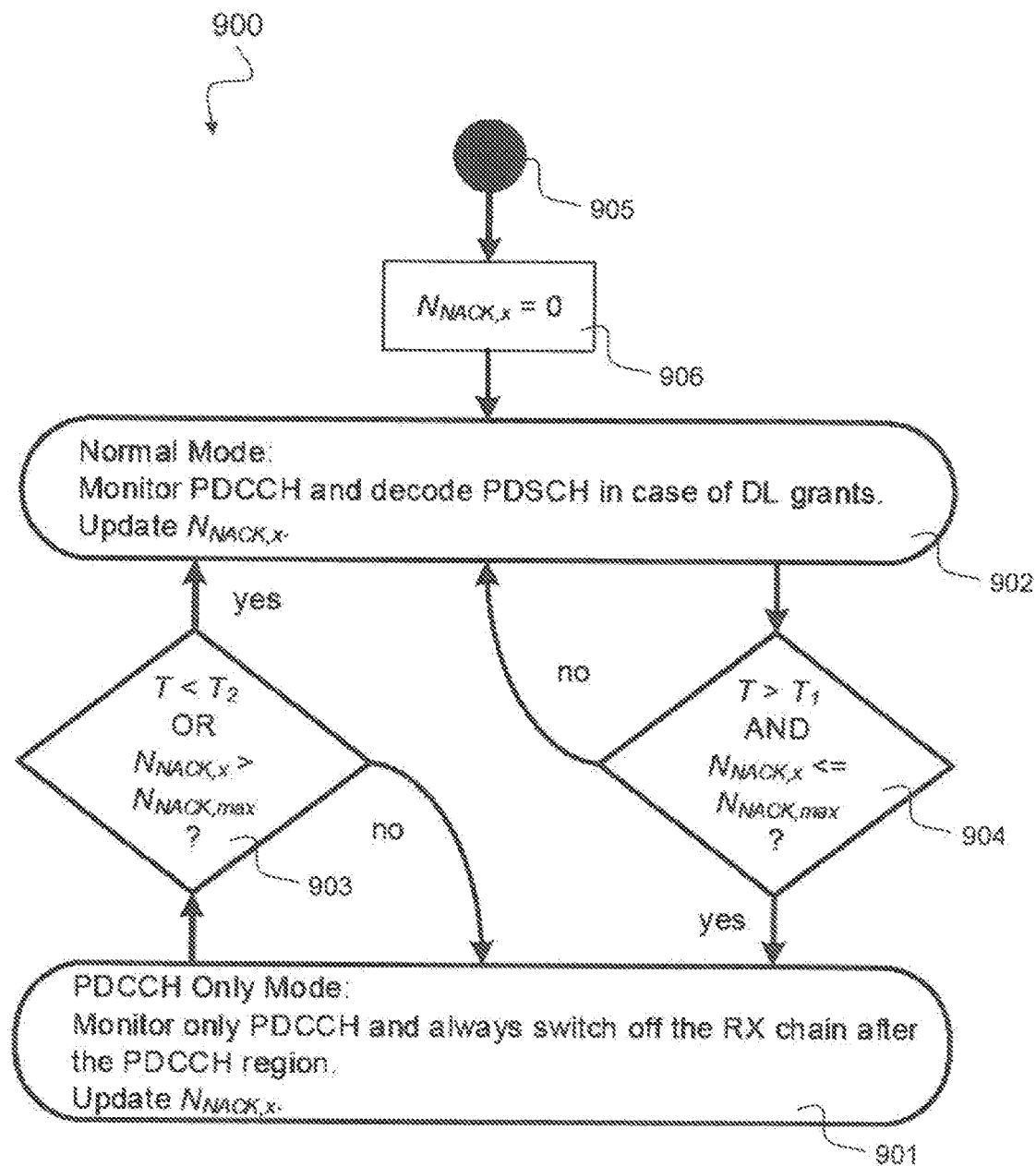
FIG. 9 is a basic state diagram 900 for entering and leaving PDCCH Only Mode according to the second approach.
Figure 10:
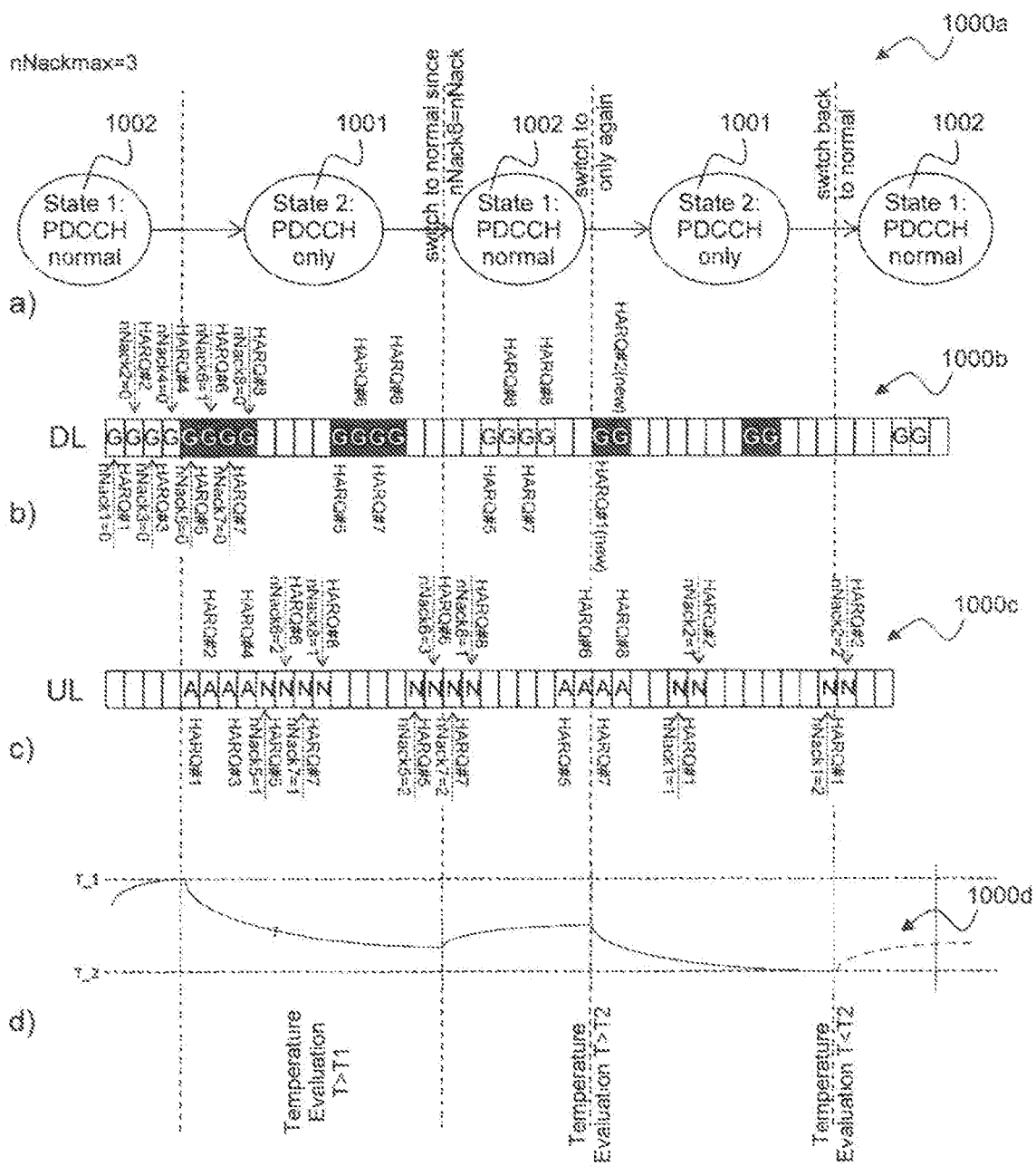
FIG. 10 schematically illustrates an exemplary utilization of the PDCCH Only Mode according to the second approach for thermal throttling.

The method 700 may further include changing from the first state 707 (corresponding to the first state 902 as described below with respect to FIG. 9 or "normal mode" or "PDCCH normal" 1002 as depicted in FIG. 10) to the second state 706 (corresponding to the second state 901 as described below with respect to FIG. 9 or "PDCCH only mode" or "PDCCH only" 1001 as depicted in FIG. 10) if a second condition with respect to both of the monitored temperature information 702 and the monitored retransmission information 703 is fulfilled.

The second condition may be fulfilled if both of the following events occur: the monitored temperature information 702 indicates that the system temperature T exceeds a first threshold T1, e.g. as depicted in FIG. 10d, and the monitored retransmission information 703 indicates that the number of pending radio subframe retransmissions $N_{NACK,x}$, e.g. as depicted in FIG. 10c, are below the given maximum number of pending radio subframe retransmissions $N_{NACK,max}$.

The retransmission information 703 may indicate a number of non-acknowledged radio subframe retransmissions per Hybrid Automatic Repeat Request (HARQ) process, e.g. as depicted in FIG. 10c.

The method 700 may further include monitoring the at least one control region 201 of at least one radio subframe 200 for UL grant information independently of a switch-off 706 of the receiving the at least one data region 202, e.g. as described above with respect to FIG. 3.

The method 700 may further include decoding the at least one data region 202 while the receiving the at least one data region is turned-on 707, e.g. as described above with respect to FIG. 3.

The method 700 may be combined with the method 300 as described above with respect to FIG. 3.

Figure 8:
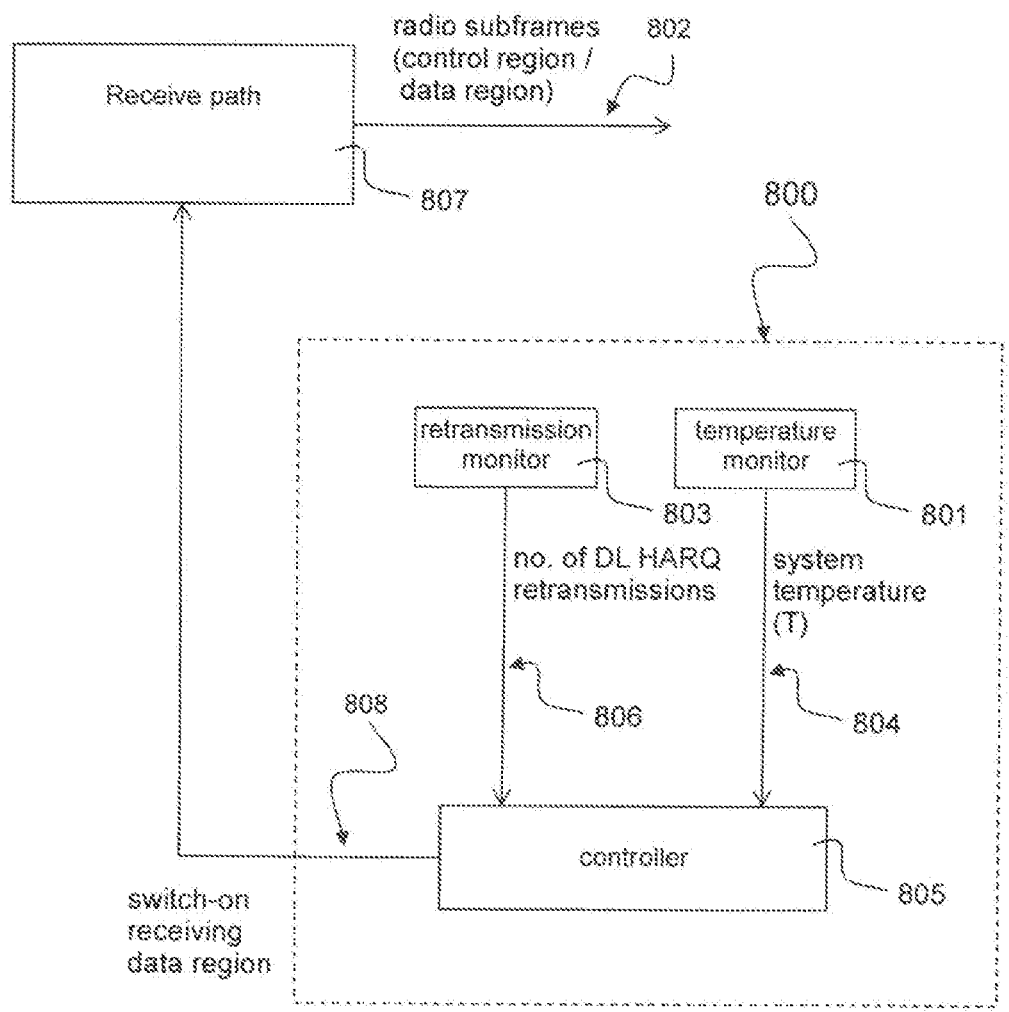
FIG. 8 schematically illustrates an exemplary temperature control device 800 for a radio receiver according to the second approach.

FIG. 8 schematically illustrates an exemplary temperature control device 800 for a radio receiver according to the second approach. The temperature control circuit 800 includes a temperature monitor 801, a retransmission monitor 803 and a controller 805.

The radio receiver includes a receive path 807 as depicted in FIG. 8 for receiving a sequence of radio subframes, e.g. LTE subframes 200 as described above with respect to FIG. 2. Each radio subframe 200 in the sequence of radio subframes includes at least one control region, e.g. a PDCCH region 201 as shown in FIG. 2 and at least one data region, e.g. a PDSCH region 202 as shown in FIG. 2.

The temperature monitor 801 monitors temperature information 804 that indicates a system temperature, e.g. a chip temperature T of the radio receiver.

The retransmission monitor 803 monitors retransmission information 806 indicating a number of pending radio subframe retransmissions $N_{NACK,x}$, e.g. as described below with respect to FIG. 10.

The controller 805 changes from a second state 901, e.g. a second state 706 as described above with respect to FIG. 7 or a second state 1001 "PDCCH only" as described below with respect to FIG. 10 in which receiving the at least one data region 202 is switched-off to a first state 902, e.g. a first state 707 as described above with respect to FIG. 7 or a second state 1002 "PDCCH normal" as described below with respect to FIG. 10 in which receiving the at least one data region 202 is turned on 808 if a first condition, e.g. a first condition 903 as described below with respect to FIG. 9, with respect to at least one of the monitored temperature information 804 and the monitored retransmission information 806 is fulfilled.

The first condition 903 may be fulfilled if at least one of the following events occur: the monitored temperature information 804 indicates that the system temperature T falls below a second threshold, e.g. a second threshold T2 as described below with respect to FIG. 10, the monitored retransmission information 806 indicates that the number of pending radio subframe retransmissions $N_{NACK,x}$ (see FIG. 10c) exceeds a given maximum number of pending radio subframe retransmissions $N_{NACK,max}$.

The controller 805 may change from the first state 902 to the second state 901 if a second condition 904 with respect to both of the monitored temperature information 804 and the monitored retransmission information 806 is fulfilled.

The second condition 904 may be fulfilled if both of the following events occur: the monitored temperature information 804 indicates that the system temperature T exceeds a first threshold T1 (see FIG. 10d), and the monitored retransmission information 806 indicates that the number of pending radio subframe retransmissions $N_{NACK,x}$ are below the given maximum number of pending radio subframe retransmissions $N_{NACK,max}$ (see FIG. 10c).

FIG. 9 is a basic state diagram 900 for entering and leaving PDCCH Only Mode according to the second approach.

This state diagram 900 illustrates a second approach for temperature control, hereinafter also referred to as the "advanced algorithm" in comparison to the so called "basic algorithm" as illustrated in the state diagram 500 described above with respect to FIG. 5.

The algorithm of the advanced algorithm is outlined in FIG. 9. Starting in "normal (decoding) mode" 902 (according to state 2 as described above with respect to FIGS. 7 and 8) after initializing 906 all $N_{NACK,x}$ with the previously observed number of retransmissions per HARQ process—typically with 0—the algorithm shall trigger "PDCCH only mode" 901 (according to state 1 as described above with respect to FIGS. 3 and 4) in case $T>T_1$ only if $N_{NACK,x}<=N_{NACK,max}$ is true 904 for all remaining DL HARQ processes. If $T>T_1$ decrease below $T_2$ or $N_{NACK,max}$ is reached for at least one of the HARQ processes observed 903, the algorithm shall trigger the mode change back to "normal (decoding) mode" 902. At this, the timeout $t_{only,max}$, as described above with respect to FIG. 5 is not required since multiple mode switches are expected during the throttling period.

The advanced algorithm of the algorithm limits the number of missed downlink HARQ retransmissions to limit the data loss for the presented throttling approach as well as to allow for further parameters to adjust the algorithm to certain scenarios. The throttling effect of the advanced algorithm is slightly lowered by switching reception modes more frequently compared to the basic algorithm described above with respect to FIGS. 5 and 6.

FIG. 10 schematically illustrates an exemplary utilization of the PDCCH Only Mode 901 according to the second approach for thermal throttling. FIG. 10 illustrates an exemplary implementation of the "advanced algorithm" as described above with respect to FIG. 9. This example is not restrictive in nature and shall mainly introduce the concept according to the disclosure rather than hinting to the duration of the throttling or the parameters chosen for the threshold.

The number of retransmission attempts $N_{NACK,x}$ per HARQ process x is taken into account and compared with a maximum number of retransmissions $N_{NACK,max}$. In the illustrated example $N_{NACK,max}=3$ and the maximum number of previous retransmission attempts is $N_{NACK,6}=1$ due to a previous retransmission not shown. As in the basic algorithm (see FIGS. 5, 6), the reception mode is switched to PDCCH only mode 1001 (see FIG. 10a) after T exceeds $T_1$ (see FIG. 10d). After transmitting a third none-acknowledgement message (see N in FIG. 10c) for HARQ #6 and 14 ms of consecutive downlink data throttling, the limit of retransmission attempts chosen by the UE for this scenario is reached so that the reception mode is switched back to "PDCCH normal decoding" 1002 again for 8 ms (see FIG. 10a), even though the temperature threshold $T_2$ has not been reached (see FIG. 10d).

After acknowledging HARQ #6 (see FIG. 10c), the UE returns to "PDCCH only mode" 1001 again for further temperature reduction. Since no switching and decision making time is considered in this example, all remaining HARQ processes #5 to #8 are finished in the illustrated example while initiated HARQ processes during this time window (HARQ #½_new) are not. This process is meant to be repeated until T reaches $T_2$ or $t_{onlyMax}$ is exceeded.

As stated for the basic algorithm above (see FIGS. 5, 6), the temperature reduction in a typical scenario will be much slower than shown in FIG. 10, so that the eNB scheduler could reduce the allocation rate after receiving consecutive NACKs. As described previously, DL Throttling is expected to be activated under high DL throughput conditions due to excessive system temperature. In this scenario, presumably UE experiences a high quality radio link and reports high CQI values to the eNB, which would allow a successful decoding of PDSCH after transition to "normal PDCCH mode" 1002. Hence, the presented approach is about to be tested on engineering builds that provide the PDCCH only feature once those are available under real network conditions to allow for further adjustments of the presented parameter set.

The advantage of temperature control techniques disclosed above over known solutions is the ongoing reception of the physical downlink control channel while discarding physical downlink shared channel allocations before they even occur. Alongside a significant temperature reduction of the UE, it is still possible to react on the eNodeB and perform uplink activity on both, control and shared channel. Furthermore, if downlink HARQ processes are considered in the throttling method as described with respect to FIGS. 7 to 10, the impact of throttling on downlink throughput is significantly reduced in comparison to other known data throttling methods.

Reducing the power consumption for a certain mode of operation is followed by a reduction of the chip temperature as well. At this, the initial temperature decrease may follow an exponential curve. In a scenario with high throughput, the PDSCH region may be the main contributor to power consumption due to the turbo decoding of the payload. The PDCCH only mode 1001 provides the opportunity to prevent the UE from the reception of the PDSCH region of a subframe at the very beginning, including switching of the RF upfront so that with the transceiver another main contributor to power consumption is included in the throttling method.

Of the above presented solutions, the advanced algorithm may be more favorable for implementation, whereas the basic algorithm introduces the instruments to utilize PDCCH only mode for thermal throttling purpose. For a final definition of the parameter set of the basic algorithm further field tests including the response of the network may be required. It is expected, that due to the higher number of mode transitions the advanced algorithm may offer a more predictable behavior at the expense of a slightly higher throttling duration.

Methods and devices according to the disclosure may coexist with other concurrent procedures, e.g. CSI report, Radio Link Monitoring, RRM Measurements, etc. The disclosed methods may be adopted for other concurrent procedures.

In case of further temperature increase beyond $T_1$, further more aggressive procedures may be applied to prevent the chip from being damaged or destroyed. Those do not have impact on the applicability on the presented approaches.

Methods and devices according to the disclosure are applicable for extended cyclic prefix and TDD configurations as well, only the detailed timings will be different to the examples shown above.

EXAMPLES

The following examples pertain to further embodiments. Example 1 is a method for temperature control in a radio receiver, the method comprising: receiving a sequence of radio subframes, wherein each radio subframe in the sequence of radio subframes comprises at least one control region and at least one data region; monitoring temperature information indicating a system temperature of the radio receiver; and if the temperature information indicates that the system temperature exceeds a first threshold, transition to a second state in which receiving the at least one data region is disabled.

In Example 2, the subject matter of Example 1 can optionally include that the system temperature comprises a chip temperature of the radio receiver.

In Example 3, the subject matter of any one of Examples 1-2 can optionally include monitoring control information from at least one control region of at least one radio subframe in the sequence of radio subframes.

In Example 4, the subject matter of Example 3 can optionally include identifying at least one adaptive Downlink Hybrid Automatic Repeat Request (HARQ) retransmission of a radio subframe from the control information.

In Example 5, the subject matter of Example 4 can optionally include providing in the second state a positive acknowledgment of the at least one adaptive Downlink HARQ retransmission in Uplink direction.

In Example 6, the subject matter of any one of Examples 1-5 can optionally include: if the temperature information indicates that the system temperature is below a second threshold, transition from the second state to a first state in which receiving the at least one data region of the sequence of radio subframes is enabled.

In Example 7, the subject matter of Example 6 can optionally include transition from the second state to the first state independent of the temperature information if a given maximum duration of stay in the second state is reached.

In Example 8, the subject matter of any one of Examples 6-7 can optionally include that in the first state receiving the at least one control region of the sequence of radio subframes is enabled to monitor information indicating a presence of user data in the corresponding at least one data region.

In Example 9, the subject matter of any one of Examples 1-8 can optionally include monitoring the at least one control region of the sequence of radio subframes for UPLINK grant information while the receiving the at least one data region is disabled.

In Example 10, the subject matter of any one of Examples 1-9 can optionally include monitoring the at least one control region of the sequence of radio subframes for UPLINK grant information and decoding the at least one corresponding data region while the receiving the at least one corresponding data region is switched-on.

Example 11 is a Temperature control circuit for a radio receiver configured to receive a sequence of radio subframes, each radio subframe in the sequence of radio subframes comprising at least one control region and at least one data region, the temperature control circuit comprising: a monitoring circuit configured to monitor temperature information indicating a system temperature of the radio receiver; and a controlling circuit configured to transition to a second state in which receiving the at least one data region is disabled if the monitored temperature information indicates that the system temperature exceeds a first threshold.

In Example 12, the subject matter of Example 11 can optionally include that the controlling circuit is configured to transition from the second state to a first state, in which receiving the at least one data region of the sequence of radio subframes is enabled, if the monitored temperature information indicates that the system temperature is below a second threshold.

In Example 13, the subject matter of any one of Examples 11-12 can optionally include a second monitoring circuit configured to monitor the at least one control region of at least one radio subframe for UPLINK grant information independently of a switch-off of the receiving the at least one data region.

In Example 14, the subject matter of Example 13 can optionally include a decoding circuit, configured to decode the at least one data region while the receiving the at least one data region is enabled.

Example 15 is a method for temperature control in a radio receiver, the method comprising: receiving a sequence of radio subframes, each radio subframe in the sequence of radio subframes comprising at least one control region and at least one data region; monitoring temperature information indicating a system temperature of the radio receiver; monitoring retransmission information indicating a number of downlink HARQ retransmissions for each downlink HARQ process; and changing from a second state in which receiving the at least one data region is disabled to a first state in which receiving the at least one data region is turned on if a first condition with respect to at least one of the monitored temperature information and the monitored retransmission information is fulfilled.

In Example 16, the subject matter of Example 15 can optionally include that the first condition is fulfilled if at least one of the following events occur: the monitored temperature information indicates that the system temperature is below a second threshold, the monitored retransmission information indicates that the number of pending radio subframe retransmissions exceeds a given maximum number of pending radio subframe retransmissions.

In Example 17, the subject matter of Example 16 can optionally include changing from the first state to the second state if a second condition with respect to both of the monitored temperature information and the monitored retransmission information is fulfilled.

In Example 18, the subject matter of Example 17 can optionally include that the second condition is fulfilled if both of the following events occur: the monitored temperature information indicates that the system temperature exceeds a first threshold, and the monitored retransmission information indicates that the number of pending radio subframe retransmissions are below the given maximum number of pending radio subframe retransmissions.

In Example 19, the subject matter of any one of Examples 15-18 can optionally include that the retransmission information indicates a number of non-acknowledged radio subframe retransmissions per Hybrid Automatic Repeat Request process.

In Example 20, the subject matter of any one of Examples 15-19 can optionally include monitoring the at least one control region of at least one radio subframe for UPLINK grant information independently of a switch-off of the receiving the at least one data region.

In Example 21, the subject matter of any one of Examples 15-20 can optionally include decoding the at least one data region while the receiving the at least one data region is enabled.

Example 22 is a temperature control device for a radio receiver configured to receive a sequence of radio subframes, each radio subframe in the sequence of radio subframes comprising at least one control region and at least one data region, the temperature controller comprising: a temperature monitor configured to monitor temperature information indicating a system temperature of the radio receiver; a retransmission monitor, configured to monitor retransmission information indicating a number of pending radio subframe retransmissions; and a controller, configured to transition from a second state in which receiving the at least one data region is disabled to a first state in which receiving the at least one data region is turned on if a first condition with respect to at least one of the monitored temperature information and the monitored retransmission information is fulfilled.

In Example 23, the subject matter of Example 22 can optionally include that the first condition is fulfilled if at least one of the following events occur: the monitored temperature information indicates that the system temperature is below a second threshold, the monitored retransmission information indicates that the number of pending radio subframe retransmissions exceeds a given maximum number of pending radio subframe retransmissions.

In Example 24, the subject matter of Example 23 can optionally include that the controller is configured to transition from the first state to the second state if a second condition with respect to both of the monitored temperature information and the monitored retransmission information is fulfilled.

In Example 25, the subject matter of Example 24 can optionally include that the second condition is fulfilled if both of the following events occur: the monitored temperature information indicates that the system temperature exceeds a first threshold, and the monitored retransmission information indicates that the number of pending radio subframe retransmissions are below the given maximum number of pending radio subframe retransmissions.

Example 26 is a computer readable non-transitory medium on which computer instructions are stored which when executed by a computer, cause the computer to perform the method of one of Examples 1 to 10 or 15 to 21.

Example 27 is a device for temperature control in a radio receiver, the device comprising: means for receiving a sequence of radio subframes, each radio subframe in the sequence of radio subframes comprising at least one control region and at least one data region; means for monitoring temperature information indicating a system temperature of the radio receiver; and means for changing to a second state in which receiving the at least one data region is disabled if the monitored temperature information indicates that the system temperature exceeds a first threshold.

In Example 28, the subject matter of Example 27 can optionally include that the system temperature comprises a chip temperature of the radio receiver.

In Example 29, the subject matter of any one of Examples 27-28 can optionally include means for monitoring control information from at least one control region of at least one radio subframe in the sequence of radio subframes.

In Example 30, the subject matter of Example 29 can optionally include means for identifying at least one adaptive Downlink Hybrid Automatic Repeat Request (HARQ) of a radio subframe from the control information.

In Example 31, the subject matter of Example 30 can optionally include means for providing in the second state a positive acknowledgment of the at least one adaptive Downlink HARQ retransmission in Uplink direction.

In Example 32, the subject matter of any one of Examples 27-31 can optionally include: means for transition from the second state to a first state in which receiving the at least one data region of the sequence of radio subframes is enabled if the monitored temperature information indicates that the system temperature is below a second threshold.

In Example 33, the subject matter of Example 32 can optionally include means for transition from the second state to the first state independently of the monitored temperature information if a given maximum duration of stay in the second state is reached.

In Example 34, the subject matter of any one of Examples 32-33 can optionally include that in the first state receiving the at least one control region of the sequence of radio subframes is enabled to monitor information indicating a presence of user data in the corresponding at least one data region.

In Example 35, the subject matter of any one of Examples 27-34 can optionally include means for monitoring the at least one control region of the sequence of radio subframes for UPLINK grant information while the receiving the at least one data region is disabled.

In Example 36, the subject matter of any one of Examples 27-35 can optionally include means for monitoring the at least one control region of the sequence of radio subframes for UPLINK grant information and means for decoding the at least one corresponding data region while the receiving the at least one corresponding data region is switched-on.

Example 37 is a Temperature control system for a radio receiver configured to receive a sequence of radio subframes, each radio subframe in the sequence of radio subframes comprising at least one control region and at least one data region, the temperature control system comprising: a monitoring subsystem configured to monitor temperature information indicating a system temperature of the radio receiver; and a controlling subsystem configured to transition to a second state in which receiving the at least one data region is disabled if the monitored temperature information indicates that the system temperature exceeds a first threshold.

In Example 38, the subject matter of Example 37 can optionally include that the controlling subsystem is configured to transition from the second state to a first state, in which receiving the at least one data region of the sequence of radio subframes is enabled, if the monitored temperature information indicates that the system temperature is below a second threshold.

In Example 39, the subject matter of any one of Examples 37-38 can optionally include a second monitoring subsystem configured to monitor the at least one control region of at least one radio subframe for UPLINK grant information independently of a switch-off of the receiving the at least one data region.

In Example 40, the subject matter of Example 39 can optionally include a decoding subsystem, configured to decode the at least one data region while the receiving the at least one data region is enabled.

Example 41 is a device for temperature control in a radio receiver, the device comprising: means for receiving a sequence of radio subframes, each radio subframe in the sequence of radio subframes comprising at least one control region and at least one data region; means for monitoring temperature information indicating a system temperature of the radio receiver; means for monitoring retransmission information indicating a number of downlink HARQ retransmissions for each downlink HARQ process; and means for transition from a second state in which receiving the at least one data region is disabled to a first state in which receiving the at least one data region is turned on if a first condition with respect to at least one of the monitored temperature information and the monitored retransmission information is fulfilled.

In Example 42, the subject matter of Example 41 can optionally include that the first condition is fulfilled if at least one of the following events occur: the monitored temperature information indicates that the system temperature is below a second threshold, the monitored retransmission information indicates that the number of pending radio subframe retransmissions exceeds a given maximum number of pending radio subframe retransmissions.

In Example 43, the subject matter of Example 42 can optionally include means for transition from the first state to the second state if a second condition with respect to both of the monitored temperature information and the monitored retransmission information is fulfilled.

In Example 44, the subject matter of Example 43 can optionally include that the second condition is fulfilled if both of the following events occur: the monitored temperature information indicates that the system temperature exceeds a first threshold, and the monitored retransmission information indicates that the number of pending radio subframe retransmissions are below the given maximum number of pending radio subframe retransmissions.

In Example 45, the subject matter of any one of Examples 41-44 can optionally include that the retransmission information indicates a number of non-acknowledged radio subframe retransmissions per Hybrid Automatic Repeat Request process.

In Example 46, the subject matter of any one of Examples 41-45 can optionally include means for monitoring the at least one control region of at least one radio subframe for UPLINK grant information independently of a switch-off of the receiving the at least one data region.

In Example 47, the subject matter of any one of Examples 41-46 can optionally include means for decoding the at least one data region while the receiving the at least one data region is enabled.

Example 48 is a temperature control system for a radio receiver configured to receive a sequence of radio subframes, each radio subframe in the sequence of radio subframes comprising at least one control region and at least one data region, the temperature control system comprising: a temperature monitor subsystem configured to monitor temperature information indicating a system temperature of the radio receiver; a retransmission monitor subsystem, configured to monitor retransmission information indicating a number of pending radio subframe retransmissions; and a controller subsystem, configured to transition from a second state in which receiving the at least one data region is disabled to a first state in which receiving the at least one data region is turned on if a first condition with respect to at least one of the monitored temperature information and the monitored retransmission information is fulfilled.

In Example 49, the subject matter of Example 48 can optionally include that the first condition is fulfilled if at least one of the following events occur: the monitored temperature information indicates that the system temperature is below a second threshold, the monitored retransmission information indicates that the number of pending radio subframe retransmissions exceeds a given maximum number of pending radio subframe retransmissions.

In Example 50, the subject matter of Example 49 can optionally include that the controller subsystem is configured to change from the first state to the second state if a second condition with respect to both of the monitored temperature information and the monitored retransmission information is fulfilled.

In Example 51, the subject matter of Example 50 can optionally include that the second condition is fulfilled if both of the following events occur: the monitored temperature information indicates that the system temperature exceeds a first threshold, and the monitored retransmission information indicates that the number of pending radio subframe retransmissions are below the given maximum number of pending radio subframe retransmissions.

In Example 52, the subject matter of any one of Examples 48-51 can optionally include that the system is an on-chip system.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method for temperature control in a radio receiver, the method comprising:
   receiving a sequence of radio subframes, wherein each radio subfratne in the sequence of radio subframes comprises at least one control region and at least one data region;
   monitoring temperature information indicating a system temperature of the radio receiver; and
   based on the temperature information indicating that the system temperature exceeds a first threshold, transitioning from a first state, in which receiving the at least one control region and the at least one data region is enabled, to a second state, in which receiving the at least one data region is disabled while maintaining reception of the at least one control region, wherein control information in the at least one control region is monitored for uplink grant information in both the first and second state, wherein the radio receiver is to transition from the second state to the first state based on the system temperature dropping below a second threshold; and
   transitioning from the second state to the first state while the system temperature is above the second threshold in response to reaching a given maximum duration of stay in the second state.

2. The method of claim 1,
   wherein the system temperature comprises a chip temperature of the radio receiver.

3. The method of claim 1, comprising:
   identifying at least one adaptive Downlink Hybrid Automatic Repeat Request (HARQ) retransmission of a radio subframe from the control information.

4. The method of claim 3, comprising:
   providing in the second state a positive acknowledgment of the at least one adaptive Downlink HARQ retransmission in an uplink direction.

5. The method of claim 1, comprising:
based at least in part on the temperature information indicating that the system temperature is below the second threshold, transitioning from the second state to the first state.

6. The method of claim 1,
wherein the at least one control region comprises a physical downlink control channel (PDCCH) and the at least one data region comprises a physical downlink shared channel (PDSCH).

7. The method of claim 1, further comprising:
monitoring retransmission information indicating a number of downlink Hybrid Automatic Repeat Request (HARQ) retransmissions for each downlink HARQ process,
wherein the radio receiver is to transition from the second state to the first state further based at least in part on the retransmission information indicating that the number of downlink HARQ retransmissions exceeds a maximum number of downlink HARQ retransmissions.

8. Temperature control circuit for a radio receiver configured to receive a sequence of radio subframes, each radio subframe in the sequence of radio subframes comprising at least one control region and at least one data region, the temperature control circuit comprising:
a monitoring circuit configured to monitor temperature information indicating a system temperature of the radio receiver; and
a controlling circuit configured to transition from a first state, in which receiving the at least one control region and the at least one data region is enabled, to a second state, in which receiving the at least one data region is disabled while maintaining reception of the at least one control region based on the monitored temperature information indicating that the system temperature exceeds a first threshold, wherein control information in the at least one control region is monitored for uplink grant information in both the first and second state, wherein the controlling circuit is further configured to transition from the second state to the first state in response to the temperature information indicating that the system temperature is below a second threshold, and wherein the controlling circuit is further configured to transition from the second state to the first state while the system temperature is above the second threshold in response to reaching a given maximum duration of stay in the second state.

9. The temperature control circuit of claim 8, wherein:
the monitoring circuit is configured to monitor temperature sensors at different locations including on chip and printed circuit board (PCB).

10. The temperature control circuit of claim 8, wherein the controlling circuit is further configured to:
identify at least one adaptive Downlink Hybrid Automatic Repeat Request (HARQ) retransmission of a radio subframe from the control information.

11. The temperature control circuit of claim 10, wherein the controlling circuit is further configured to:
provide in the second state a positive acknowledgment of the at least one adaptive Downlink HARQ retransmission in an uplink direction.

12. The temperature control circuit of claim 8, wherein the system temperature comprises a chip temperature of the radio receiver.

13. The temperature control circuit of claim 8, further comprising:
a retransmission monitoring circuit configured to monitor retransmission information indicating a number of downlink Hybrid Automatic Repeat Request (HARQ) retransmissions for each downlink HARQ process,
wherein the controlling circuit is to transition from the second state to the first state further based at least in part on the retransmission information indicating that the number of downlink HARQ retransmissions exceeds a maximum number of downlink HARQ retransmissions.

14. The temperature control circuit of claim 8,
wherein the at least one control region comprises a physical downlink control channel (PDCCH) and the at least one data region comprises a physical downlink shared channel (PDSCH).

15. A temperature control device for a radio receiver configured to receive a sequence of radio subframes, wherein each radio subframe in the sequence of radio subframes comprises at least one control region and at least one data region, the temperature control device comprising:
a temperature monitor configured to monitor emperature information indicating a system temperature of the radio receiver;
a controller, configured to transition from a second state, in which receiving the at least one data region is disabled while maintaining reception of the at least one control region, to a first state, in which receiving the at least one control region and the at least one data region is enabled, in response to the monitored temperature information indicating that the system temperature is below a second threshold,
wherein the controller is further configured to transition from the first state to the second state in response to the monitored temperature information indicating that the system temperature is above a first threshold, wherein control information in the at least one control region is monitored for uplink grant information in both the first and second state,
wherein the controller is further configured to transition from the second state to the first state while the system temperature is above the second threshold in response to reaching a given maximum duration of stay in the second state.

16. The temperature control device of claim 15, wherein the controller is configured to transition from the first state to the second state further based on fulfillment of a second condition with respect to both of the temperature information and the retransmission information.

17. The temperature control device of claim 16, wherein the second condition is fulfilled based on occurrence of both of the following events:
the temperature information indicates that the system temperature exceeds a first threshold, and
the retransmission information indicates that the number of pending radio subframe retransmissions are below a given maximum number of pending radio subframe retransmissions.

18. The temperature control device of claim 15, the temperature control device further comprising:
a retransmission monitor, configured to monitor retransmission information indicating a number of pending radio subframe retransmissions,
wherein the first condition is fulfilled further based on the retransmission information indicating that the number of pending radio subframe retransmissions exceeds a given maximum number of pending radio subframe retransmissions.

19. The temperature control device of claim 15, wherein the system temperature comprises a chip temperature of the radio receiver.

20. The temperature control device of claim 15, wherein the at least one control region comprises a physical downlink control channel (PDCCH) and the at least one data region comprises a physical downlink shared channel (PDSCH).

\* \* \* \* \*